(12) United States Patent
Morioka

(10) Patent No.: US 7,156,563 B2
(45) Date of Patent: Jan. 2, 2007

(54) OPTICAL MODULE, METHOD FOR PRODUCING SAME AND HOLDER FOR OPTICAL MODULE

(75) Inventor: Shimpei Morioka, Yokohama (JP)

(73) Assignee: Enplas Corporation, Saitama (JP)

( * ) Notice: Subject to any disclaimer, the term of this patent is extended or adjusted under 35 U.S.C. 154(b) by 180 days.

(21) Appl. No.: 10/850,801

(22) Filed: May 21, 2004

(65) Prior Publication Data
US 2004/0264890 A1    Dec. 30, 2004

(30) Foreign Application Priority Data
May 27, 2003 (JP) .............................. 2003-148890

(51) Int. Cl.
G02B 6/42 (2006.01)
G02B 6/32 (2006.01)
G02B 6/36 (2006.01)
(52) U.S. Cl. .............................. 385/93; 385/33; 385/79
(58) Field of Classification Search .................. 385/33, 385/35, 79, 93
See application file for complete search history.

(56) References Cited

U.S. PATENT DOCUMENTS

| | | | | |
|---|---|---|---|---|
| 5,257,336 A | * | 10/1993 | Dautartas ..................... | 385/93 |
| 5,692,083 A | * | 11/1997 | Bennett ........................ | 385/88 |
| 5,973,862 A | * | 10/1999 | Hashizume ................. | 359/819 |
| 6,758,611 B1 | * | 7/2004 | Levin et al. .................. | 385/93 |
| 6,915,049 B1 | * | 7/2005 | Murata ........................ | 385/52 |

FOREIGN PATENT DOCUMENTS

| | | |
|---|---|---|
| JP | 10-300994 | 11/1998 |
| JP | 2002-43675 | 2/2002 |

* cited by examiner

*Primary Examiner*—John D. Lee
(74) *Attorney, Agent, or Firm*—Bachman & LaPointe, P.C.

(57) ABSTRACT

After a tolerance of width B during the mounting of a photoelectric transfer element 8 is previously set, a holder 3 is formed so that a dimensional error A on the end portion of the holder 3 on the side of the photoelectric transfer element 8 in directions parallel to an optical axis 4 satisfies a condition of A<B with respect to the tolerance of width B, and then, a substrate 9 on which the photoelectric transfer element 8 is mounted is caused to contact the end face of the holder 3 on the side of the photoelectric transfer element 8 to form an optical module 1.

2 Claims, 4 Drawing Sheets

OPTICAL MODULE, METHOD FOR PRODUCING SAME AND HOLDER FOR OPTICAL MODULE

BACKGROUND OF THE INVENTION

1. Field of the Invention

The present invention generally relates to an optical module, a method for producing the same and a holder for the optical module. More specifically, the invention relates to an optical module suitable for high-speed and large-capacity optical communication using an optical fiber, a method for producing the same and a holder for the optical module.

2. Description of the Background Art

In recent years, the request for optical fiber communication technology using optical fibers increases as the transmission speed and capacity for data communication increase. A typical optical module for such optical fiber communication comprises: a package called CAN package housing therein a photoelectric transfer element (e.g., a package housing therein a semiconductor light emitting element, such as a semiconductor laser, or a semiconductor light receiving element, such as a photodiode); a ferrule for holding an end face of an optical fiber; a lens; and a holder for housing therein them.

In such an optical module, a photoelectric transfer element in the photoelectric transfer element package is optically coupled with the optical fiber, which is held by the ferrule, via the lens to enable optical communication.

As examples of such optical modules, there are proposed optical modules disclosed in Japanese Patent Laid-Open Nos. 10-300994 and 2002-43675. In these optical modules, a photoelectric transfer element package, a ferrule and a lens are separated, so that an aligning operation for aligning the optical axes of the respective parts with each other must be carried out when the parts are housed in a holder. Therefore, in these optical modules, working and assembling efficiencies are not good.

Therefore, the inventor has diligently studied and proposed an optical module wherein a lens and a holder are formed of a plastic by integral molding (Japanese Patent Application No. 2003-026656). In such an optical module, since it is not required to align the optical axis of the lens with the axis of the holder, it is possible to facilitate the assembly of the optical module, so that it is possible to improve the production efficiency of the optical module.

As a conventional method for aligning a holder with a photoelectric transfer element, there is used an aligning method called active alignment for determining the optimum position of a photoelectric transfer element by actually causing the photoelectric transfer element to emit or receive signal light. In such a method, it is required to carry out alignment with respect to all of three axes of X- and Y-axes perpendicular to an optical axis and Z-axis parallel to the optical axis.

Therefore, the inventor has diligently studied and considered that, if such alignment in directions of three axes is simplified, it is possible to reduce the number of assembling steps, and it is possible to make the advantageous effects of the above described optical module with lens-integrated holder more effective. Thus, the inventor has made the present invention.

SUMMARY OF THE INVENTION

It is therefore an object of the present invention to eliminate the aforementioned problems and to provide a high performance optical module capable of simplifying an assembling process, reducing the number of parts, reducing production costs, and improving productivity, a method for producing the same, and a holder for the optical module.

In order to accomplish the aforementioned and other objects, according to one aspect of the present invention, an optical module comprises: a holder having an optical fiber mounting hole for mounting therein an optical fiber in one end portion thereof in directions parallel to an optical axis; a photoelectric transfer element mounted on a substrate which contacts an end face of the other end portion of the holder to be mounted thereon; and a lens, arranged in the holder between the one end portion and the other end portion, for causing the optical fiber to be optically coupled with the photoelectric transfer element.

This optical module can be sufficiently adapted to optical communication wherein it is expected that transmission speed and capacity for data communication will increase in future, if the substrate-mounted type photoelectric transfer element is used in place of a conventional CAN package.

In the above described optical module, the relationship between a dimensional error A on the other end portion of the holder in directions parallel to the optical axis and a preset tolerance of width B during the mounting of the photoelectric transfer element on the holder via the substrate preferably satisfies a condition of A<B.

Furthermore, throughout the specification, the term "tolerance of width B during the mounting of the photoelectric transfer element" means a width in directions parallel to the optical axis until the conversion efficiency between light signals (light information) and electric signals (electric information) between the optical fiber and the photoelectric transfer element is decreased by 1.0 dB from the set maximum efficiency when the photoelectric transfer element is mounted, and defines a range in which the lens can be used.

If the holder is thus formed so that the relationship between the preset tolerance of width B during the mounting of the photoelectric transfer element and the dimensional error A on the other end portion (the end portion on the side of the photoelectric transfer element) in directions parallel to the optical axis satisfies a condition of A<B, the positioning of the photoelectric transfer element in the directions parallel to the optical axis thereof (in directions of Z-axis) can be completed if only the substrate-mounted type photoelectric transfer element is caused to contact the end face of the end portion of the holder on the side of the photoelectric transfer element. Therefore, it is not required to carry out alignment in the directions parallel to the optical axis, so that it is possible to reduce the number of steps of assembling the optical module.

In above described the optical module, the lens and the holder may be integrally formed. If the lens and the holder are thus integrally formed, it is possible to reduce the number of steps of assembling the optical module.

In the above described optical module, the lens preferably has a power which is set to be in the range of 0.8 to 1.2. If the power of the lens, which can be regarded as substantially univocally participating in the tolerance of width B during the mounting of the photoelectric transfer element, is thus set to be in the range of from 0.8 to 1.2, the tolerance of width B during the mounting of the photoelectric transfer element can sufficiently. satisfy the condition of A<B by a simple design. In addition, the tolerance of the position of the end face of the optical fiber on the optical axis can be substantially equal to the tolerance of width B during the mounting of the photoelectric transfer element. Therefore, the influence of the displacement of the end face of the optical fiber on optical performance can be decreased, so that handling can be improved. Moreover, it is possible to obtain satisfied optical performance even if the optical module is adapted to any one of transmitting and receiving sides (light emitting and receiving sides). Therefore, the specification of the optical module can be commonly used on the transmitting and receiving sides, so that it is possible to decrease the number of parts.

In the above described optical module, the photoelectric transfer element may be mounted on a surface of the substrate facing the lens. Alternatively, the photoelectric transfer element may be mounted on an opposite surface of the substrate to the lens. In this case, optical parts, such as a light-quantity damping filter, can be mounted on the surface of the substrate on the side of the lens, so that it is possible to carry out various designs.

According to another aspect of the present invention, there is provided a method for producing an optical module which comprises: a holder having an optical fiber mounting hole for mounting therein an optical fiber in one end portion thereof in directions parallel to an optical axis; a photoelectric transfer element mounted on a substrate which contacts an end face of the other end portion of the holder to be mounted thereon; and a lens, arranged in the holder between the one end portion and the other end portion, for causing the optical fiber to be optically coupled with the photoelectric transfer element, the method comprising the steps of: previously setting a tolerance of width B during the mounting of the photoelectric transfer element on the other end portion of the holder; forming the holder so that a dimensional error A on the other end portion of the holder in directions parallel to the optical axis satisfies a condition of A<B with respect to the tolerance of width B; and causing the substrate, on which the photoelectric transfer element is mounted, to contact an end face of the other end of the holder.

In this method, after the tolerance of width B during the mounting of the photoelectric transfer element is previously set, the holder is formed so that the dimensional error A on the end face of the other end portion of the holder (the end portion on the side of the photoelectric transfer element) in directions parallel to the optical axis satisfies a condition of A<B with respect to the tolerance of width B. Thus, the positioning of the photoelectric transfer element in the directions parallel to the optical axis thereof (in directions of Z-axis) can be completed if only the substrate-mounted type photoelectric transfer element is caused to contact the end face of the end portion of the holder on the side of the photoelectric transfer element. Therefore, it is not required to carry out alignment in the directions parallel to the optical axis, so that it is possible to reduce the number of steps of assembling the optical module. Moreover, it is possible to produce an optical module capable of being sufficiently adapted to optical communication wherein it is expected that transmission speed and capacity for data communication will increase in future, if the substrate-mounted type photoelectric transfer element is used in place of a conventional CAN package.

In the above described method, the lens and the holder may be integrally formed. If the lens and the holder are thus integrally formed, it is possible to reduce the number of steps of assembling the optical module.

In the above described method, the lens preferably has a power which is set to be in the range of 0.8 to 1.2. If the power of the lens, which can be regarded as substantially univocally participating in the tolerance of width B during the mounting of the photoelectric transfer element, is thus set to be in the range of from 0.8 to 1.2, the tolerance of width B during the mounting of the photoelectric transfer element can sufficiently satisfy the condition of A<B by a simple design. In addition, the tolerance of the position of the end face of the optical fiber on the optical axis can be substantially equal to the tolerance of width B during the mounting of the photoelectric transfer element. Therefore, the influence of the displacement of the end face of the optical fiber on optical performance can be decreased, so that handling can be improved. Moreover, it is possible to obtain satisfied optical performance even if the optical module is adapted to any one of transmitting and receiving sides (light emitting and receiving sides). Therefore, the specification of the optical module can be commonly used on the transmitting and receiving sides, so that it is possible to decrease the number of parts.

According to a further aspect of the present invention, there is provided a holder for an optical module, the holder comprising: a holder body; an optical fiber mounting hole, formed in one end portion of the holder body in directions parallel to an optical axis, for mounting therein an optical fiber; and a photoelectric transfer element mounting portion, formed on an end face of the other end portion of the holder body, for mounting thereon a photoelectric transfer element, wherein the holder body is capable of housing therein a lens between the one end portion and the other end portion so as to cause the optical fiber to be optically coupled with the photoelectric transfer element.

In this holder, the relationship between a dimensional error A on the other end portion of the holder body in directions parallel to the optical axis and a preset tolerance of width B during the mounting of the photoelectric transfer element on the holder body preferably satisfies a condition of A<B.

If the holder is thus formed so that the relationship between the preset tolerance of width B during the mounting of the photoelectric transfer element and the dimensional error A on the other end portion (the end portion on the side of the photoelectric transfer element) in directions parallel to the optical axis satisfies a condition of A<B, the positioning of the photoelectric transfer element in the directions parallel to the optical axis thereof (in directions of Z-axis) can be completed if only the substrate-mounted type photoelectric transfer element is caused to contact the end face of the end portion of the holder on the side of the photoelectric transfer element. Therefore, it is not required to carry out alignment in the directions parallel to the optical axis, so that it is possible to reduce the number of steps of assembling the optical module. Moreover, the holder can be sufficiently adapted to optical communication wherein it is expected that transmission speed and capacity for data communication will increase in future, if the substrate-mounted type photoelectric transfer element is used in place of a conventional CAN package.

In the above described holder, the lens and the holder may be integrally formed. If the lens and the holder are thus integrally formed, it is possible to reduce the number of steps of assembling an optical module.

In the above described holder, the lens preferably has a power which is set to be in the range of 0.8 to 1.2. If the power of the lens, which can be regarded as substantially univocally participating in the tolerance of width B during the mounting of the photoelectric transfer element, is thus set to be in the range of from 0.8 to 1.2, the tolerance of width B during the mounting of the photoelectric transfer element can sufficiently satisfy the condition of A<B by a simple design. In addition, the tolerance of the position of the end face of the optical fiber on the optical axis can be substantially equal to the tolerance of width B during the mounting of the photoelectric transfer element. Therefore, the influence of the displacement of the end face of the optical fiber on optical performance can be decreased, so that handling can be improved. Moreover, it is possible to obtain satisfied optical performance even if the optical module is adapted to any one of transmitting and receiving sides (light emitting and receiving sides). Therefore, the specification of the optical module can be commonly used on the transmitting and receiving sides, so that it is possible to decrease the number of parts.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENTS

Referring now to the accompanying drawings, the preferred embodiments of the present invention will be described below in detail.

First, referring to FIG. 1, the preferred embodiment of a method for producing an optical module according to the present invention will be described below.

Figure 1:
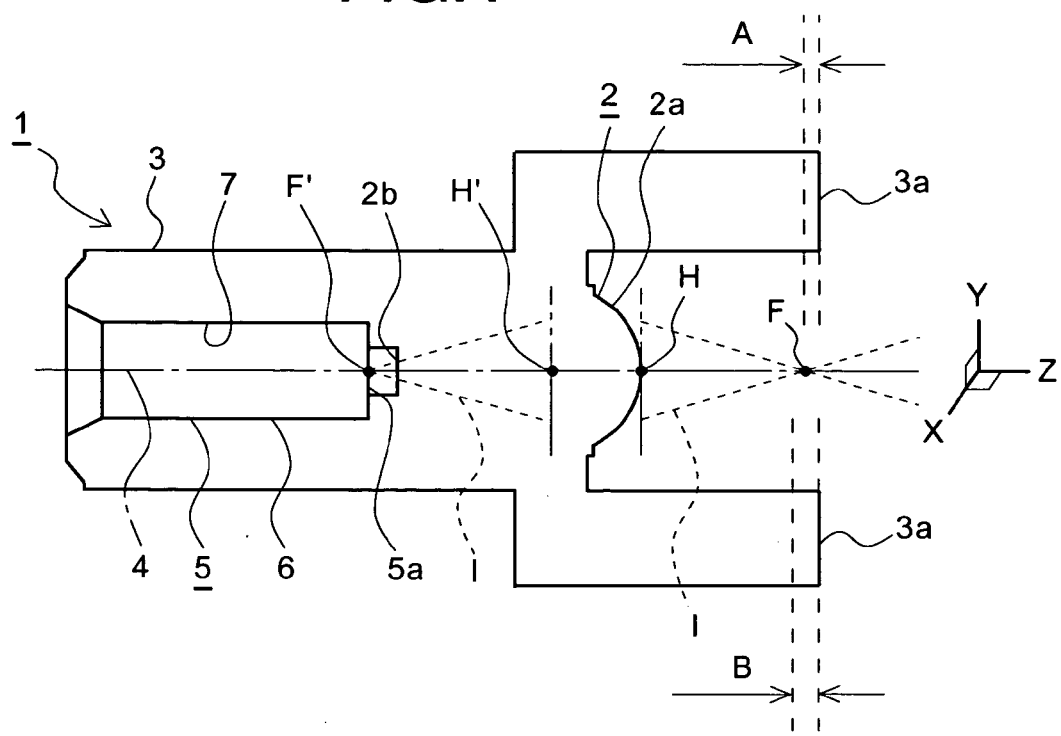
FIG. 1 is an illustration for explaining a preferred embodiment of a method for producing an optical module according to the present invention.

As shown in FIG. 1, an optical module 1 produced in this preferred embodiment has a lens 2 and a holder 3 for holding the outer periphery of the lens 2. The lens 2 and the holder 3 are integrally formed or molded by injection-molding a resin material, such as a phototransparent plastic, e.g., PEI (polyetherimide), PC (polycarbonate) or PMMA (polymethylmethacrylate). If the lens 2 and the holder 3 are thus integrally formed, it is possible to reduce the number of steps of assembling the optical module 1.

The holder 3 has an elongated shape extending along an optical axis 4. On one end portion (left end portion in FIG. 1) of the holder 3 in directions parallel to the optical axis 4, an optical fiber mounting hole 7 for mounting therein an optical fiber 5 (see FIGS. 2 and 3) with a ferrule 6 is formed.

On the other end portion (right end portion in FIG. 1) of the holder 3, a photoelectric transfer element 8 (see FIGS. 2 and 3) is designed to be mounted. More specifically, the other end portion of the holder 3 is formed so as to be a cylindrical portion protruding from the outer periphery of the lens 2 toward the photoelectric transfer element 8 along the optical axis 4. The end face 3a of the cylindrical portion on the side of the photoelectric transfer element 8 is designed to contact and hold a substrate 9 (see FIGS. 2 and 3), on which the photoelectric transfer element 8 is mounted, so that the substrate 9 is perpendicular to the optical axis 4.

The lens 2 is a convex-flat lens wherein a surface (first surface) 2a on the side of the photoelectric transfer element 8 is convex and a surface (second surface) 2b on the side of the optical fiber 5 is flat, but the lens 2 may have another shape.

In order to actually produce the optical module 1 with such a basic construction, in this preferred embodiment, a tolerance of width B in directions parallel to the optical axis 4 (in directions of Z-axis) shown in FIG. 1 during the mounting of the photoelectric transfer element 8 is first previously set. Furthermore, the term "tolerance of width B" during the mounting of the photoelectric transfer element 8 means a width in directions parallel to the optical axis 4 until the conversion efficiency between light signals (light information) and electric signals (electric information) between the optical fiber 5 and the photoelectric transfer element 8 is decreased by 1.0 dB from the set maximum efficiency when the photoelectric transfer element 8 is mounted, and defines a range in which the lens 2 can be used.

It can be considered that the conversion efficiency between light signals and electric signals is maximum at a focal point F (a position on the optical axis 4 of the photoelectric transfer element 8) of light beams 1, which pass through the lens 2, on the side of the photoelectric transfer element 8. Therefore, as shown in FIG. 1, the tolerance of width B is a distance in directions parallel to the optical axis 4 between the end face 3a and a position at which the conversion efficiency is decreased by 1.0 dB if the position of the photoelectric transfer element 8 leaves the focal point F along the optical axis 4.

After the tolerance of width B is thus set, when the optical module 1 is actually formed, the holder 3 and the lens 2 are formed so as to satisfy the following conditional expression (1):

$$A < B \tag{1}$$

wherein A denotes a dimensional error (see FIG. 1) with respect to the end face 3a of the end portion of the holder 3 on the side of the photoelectric transfer element 8 in directions parallel to the optical axis 4, and B denotes the above described tolerance of width when the photoelectric transfer element 8 is mounted.

The expression (1) means that the holder 3 and the lens 2 are formed so that the dimensional error A is within the tolerance of width B by strictly managing the dimension in design with respect to the end face 3a of the holder 3 on the side of the photoelectric transfer element 8 while the tolerance of width B is large to some extent.

If the holder 3 and the lens 2 are thus formed, the positioning of the photoelectric transfer element 8 in directions parallel to the optical axis 4 (in directions of Z-axis) can be completed if only the substrate-mounted type photoelectric transfer element 8 is caused to contact the end face 3a of the holder 3 on the side of the photoelectric transfer element 8.

As a result, it is not required to carry out alignment in directions parallel to the optical axis 4, so that it is possible to reduce the number of steps of assembling the optical module 1.

Moreover, if the substrate-mounted type photoelectric transfer element 8 is used in place of a conventional CAN package, the optical module 1 can be sufficiently adapted to optical communication wherein it is expected that transmission speed and capacity for data communication will increase in future. That is, if the conventional CAN package is used, when the photoelectric transfer element is driven at a high frequency, electromagnetic waves leak out of the portion of wiring, which is connected to the photoelectric element, to cause crosstalk, so that it is not possible to appropriately carry out a high-speed communication at a high frequency of, e.g., 10 GHz. On the other hand, if the substrate-mounted type photoelectric transfer element is used as this preferred embodiment, the wiring connected to the photoelectric transfer element can be formed on the substrate. Therefore, it is easy to suitably design the length and spacing of wiring so as to decrease crosstalk, so that it is possible to sufficiently carry out a high-speed communication at a high frequency of 10 GHz or more.

More preferably, when the tolerance of width B is set, the following conditional expression (2) is satisfied:

$$0.8 \leq \beta \leq 1.2 \text{ (more preferably } \beta=1) \quad (2)$$

wherein $\beta$ denotes the power of the lens 2. If the convex-flat lens is used as shown in FIG. 1, the power of the lens 2 satisfies the following expression:

$$\beta = b/a \quad (3)$$

wherein $a$ denotes a distance between a focal point F' of light beams l, which pass through the lens 2, on the side of the optical fiber 5 and a principal point H' of the lens 2 on the side of the optical fiber 5, and $b$ denotes a distance between a focal point F of light beams l, which pass through the lens 2, on the side of the photoelectric transfer element 8 and a principal point H (a vertex of the convex face 2a) of the lens 2 on the side of the photoelectric transfer element 8.

In the convex-flat lens shown in the figure, the principal point H' of the lens 2 on the side of the flat face is a point on the optical axis 4, which is apart from a point S', at which the optical axis 4 crosses the flat face, toward the convex face 2a by d/n (d: thickness of lens, n: refractive index of lens) (S'H'=|d/n|), and the principal point H of the lens 2 on the side of the convex face 2a is coincident with a point S at which the optical axis 4 crosses the convex face 2a (SH=0).

If the value of $\beta$ is smaller than the value of 0.8 expressed by expression (2), the tolerance of width B is extended, but the tolerance of the position of the end face 5a of the optical fiber 5 (see FIGS. 2 and 3) on the optical axis 4 is decreased. For example, the influence (e.g., deterioration in optical coupling efficiency) of the displacement of the end face 5a of the optical fiber 5 on optical performance during the engagement and disengagement of the optical fiber 5 with and from the holder 3 is increased, so that the optical module 1 is not so easy to handle.

On the other hand, if the value of $\beta$ exceeds the value of 1.2 expressed by expression (2), the tolerance of width B decreases, so that it is difficult to satisfy expression (1). Therefore, the management of the dimensional error A in the producing process must be more strictly carried out.

Since the value of $\beta$ can be thus regarded as univocally participating in the tolerance of width B, if the value of $\beta$ is set to be 1.0 or a value approximating 1.0 as expressed by expression (2), conditional expression (1) can be satisfied by a simple design.

If expression (2) is satisfied, the tolerance of the position of the end face 5a of the optical fiber 5 on the optical axis 4 can be substantially equal to the tolerance of width B. Therefore, the influence of the displacement of the end face 5a of the optical fiber 5 on optical performance can be decreased, so that handling can be improved.

Moreover, if expression (2) is satisfied, it is possible to obtain satisfied optical performance even if the optical module 1 is adapted to any one of transmitting and receiving sides, so that it is possible to further decrease the number of parts by commonly using the specification of the optical module 1 on the transmitting and receiving sides.

Figure 2:
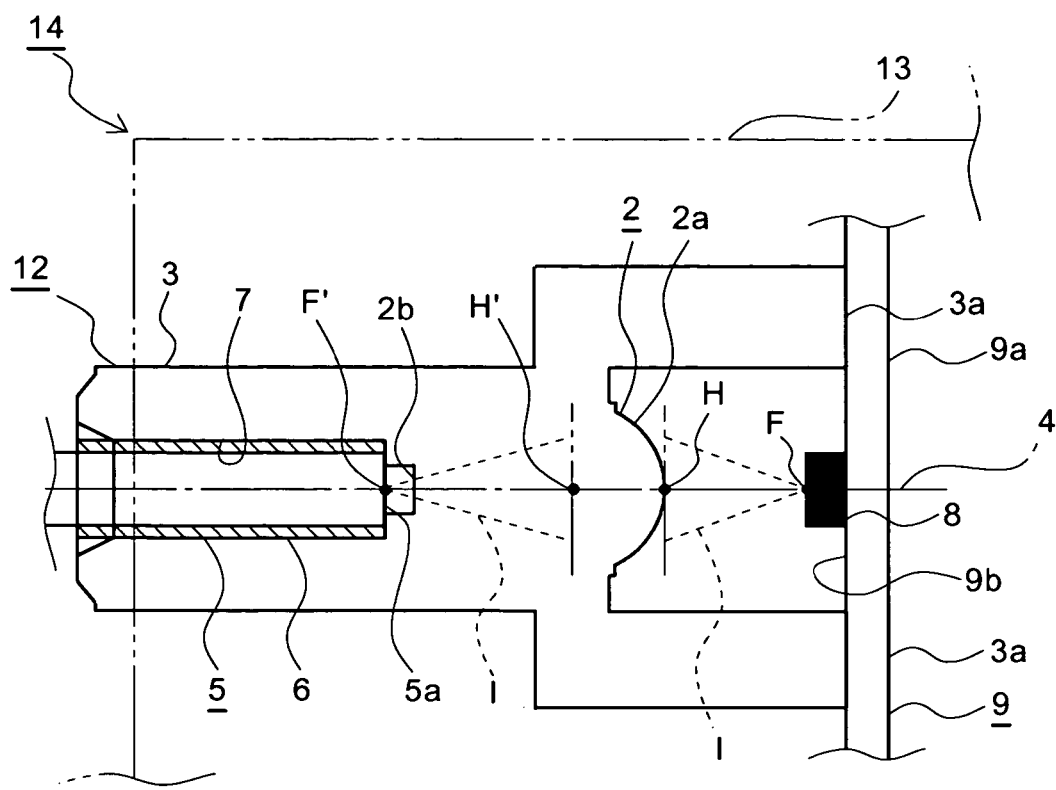
FIG. 2 is a longitudinal section schematically showing the first preferred embodiment of an optical module according to the present invention.

Referring to FIG. 2, the first preferred embodiment of an optical module produced by the above described producing method according to the present invention will be described below.

As shown in FIG. 2, an optical module 12 in the first preferred embodiment is efficiently produced by a simple producing process wherein alignment in directions parallel to the optical axis 4 is omitted by causing the substrate 9, on which the photoelectric transfer element 8 is mounted, to contact the end face 3a of the holder 3 of FIG. 1 on the side of the photoelectric transfer element 8.

In this preferred embodiment, the photoelectric transfer element 8 is mounted at a position on the optical axis 4 on the surface (second surface) 9b of the substrate on the side of the lens 2 by a technique such as embedding.

In the optical fiber mounting hole 7, the optical fiber, together with the ferrule 6, is designed to be detachably mounted.

In this preferred embodiment, the photoelectric transfer element 8 can be air-tightly held in a space surrounded by the lens 2, the cylindrical portion of the holder 3, and the substrate 9. Therefore, it is possible to prevent foreign matters, such as dust, from adhering to the photoelectric transfer element 8, so that it is possible to maintain good optical performance.

Such an optical module 12 is housed in a housing 13 as a light emitting or receiving optical module as shown in FIG. 2, and a lead terminal is connected to an electric substrate (not shown) in the housing 13 to form an optical connector 14.

In this case, the optical module 12 is formed so that the power is 1.0 or a value approximating 1.0 as expressed by expression (2), so that it is possible to provide satisfied optical performance if the optical module 12 is used as any one of light emitting and receiving optical modules.

Figure 3:
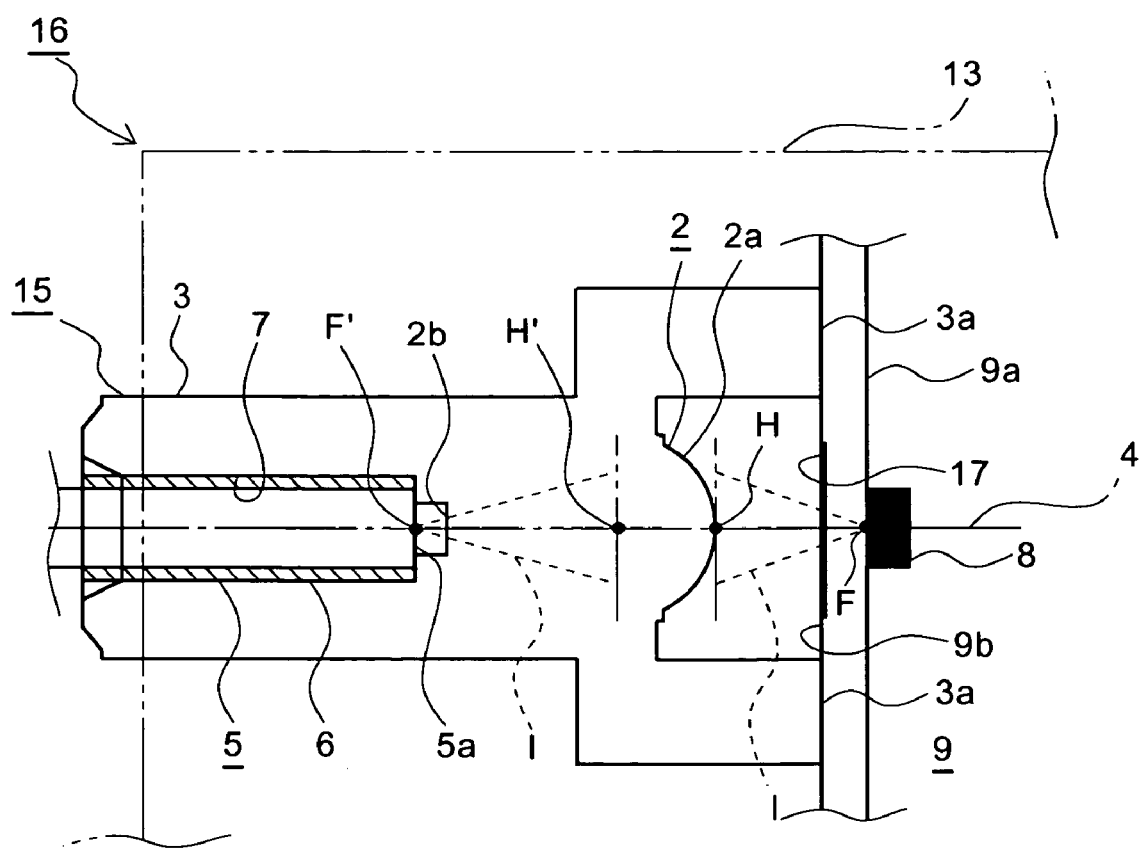
FIG. 3 is a longitudinal section schematically showing the second preferred embodiment of an optical module according to the present invention.

Referring to FIG. 3, the second preferred embodiment of an optical module according to the present invention will be described below.

As shown in FIG. 3, similar to FIG. 2, an optical module 15 in the second preferred embodiment is efficiently produced by a simple producing process wherein alignment in directions parallel to the optical axis 4 is omitted by causing the substrate 9, on which the photoelectric transfer element 8 is mounted, to contact the end face 3a of the holder 3 of FIG. 1 on the side of the photoelectric transfer element 8.

However, in the optical module 15 in this preferred embodiment unlike the first preferred embodiment, the photoelectric transfer element 8 is mounted at a position on the optical axis 4 on a surface (first surface) 9a of the substrate 9 opposite to the lens 2.

In this preferred embodiment, a space is formed on the surface 9b of the substrate 9 on the side of the lens 2, so that optical parts 17, such as a light-quantity damping filter, can be mounted on the surface 9b.

Similar to the optical module 12 shown in FIG. 2, the optical module 15 can provide good optical performance if it is used as any one of light emitting and receiving optical modules. When the optical module 15 is actually used, it is housed in the housing 13 as shown in FIG. 3, and a lead terminal is connected to an electric substrate (not shown) in the housing 13 to form an optical connector 16.

EXAMPLE

As an example, the optical module 15, wherein the photoelectric transfer element 8 is mounted on the surface (first surface) 9a of the substrate 9 opposite to the lens 2, is produced as shown in FIG. 3.

At this time, the tolerance of width B is set. In this example, the tolerance of width B is univocally derived from the power β of the lens 2 according to the following conditions of optical surfaces.

Furthermore, in the following conditions of optical surfaces, $r$ denotes a radius of curvature of an optical surface (a central radius of curvature in the case of the lens 2), and $d$ denotes a distance between a certain optical surface and the next optical surface, $n$ denoting a refractive index of an optical system when a design central wavelength is set to be 850 nm, and $k$ denoting a conical constant as a coefficient defining the shape of the surface of the lens 2.

| Number of Surface | | r | d | n | k |
|---|---|---|---|---|---|
| 1 | (First Surface of Substrate) | 0 | 0.30 | 1.5094 | |
| 2 | (Second Surface of Substrate) | 0 | 2.47 | | |
| 3 | (First Surface of Lens) | 0.673 | 3.55 | 1.5052 | −1.088 |
| 4 | (Second Surface of Lens) | 0 | 0.30 | | |
| 5 | (End Face of Optical Fiber) | 0 | | | |

In this case, the principal point H on the side of the photoelectric transfer element 8 is the vertex of the first surface 2a of the lens 2, and the principal point H' on the side of the optical fiber 5 is a point on the optical axis 4, which is apart from the second surface 2b of the lens 2 in the positive direction of Z-axis by lens thickness/n.

In this case, $a$ in expression (3) is the sum (2.66 mm) of the distance (0.30 mm) between the second surface 2b of the lens 2 and the end face 5a of the optical fiber 5, and the distance (3.55/1.5052 mm) between F' and H'.

In addition, $b$ in expression (3) is the distance (2.67 mm) between F and H. This distance (2.67 mm) between F and H is the sum of an air-converted length (0.3/n) of the substrate (glass) and the distance between the second surface of the substrate and the first surface 2a of the lens 2.

Therefore, the power β is about 1.0 to satisfy expression (3).

Figure 4:
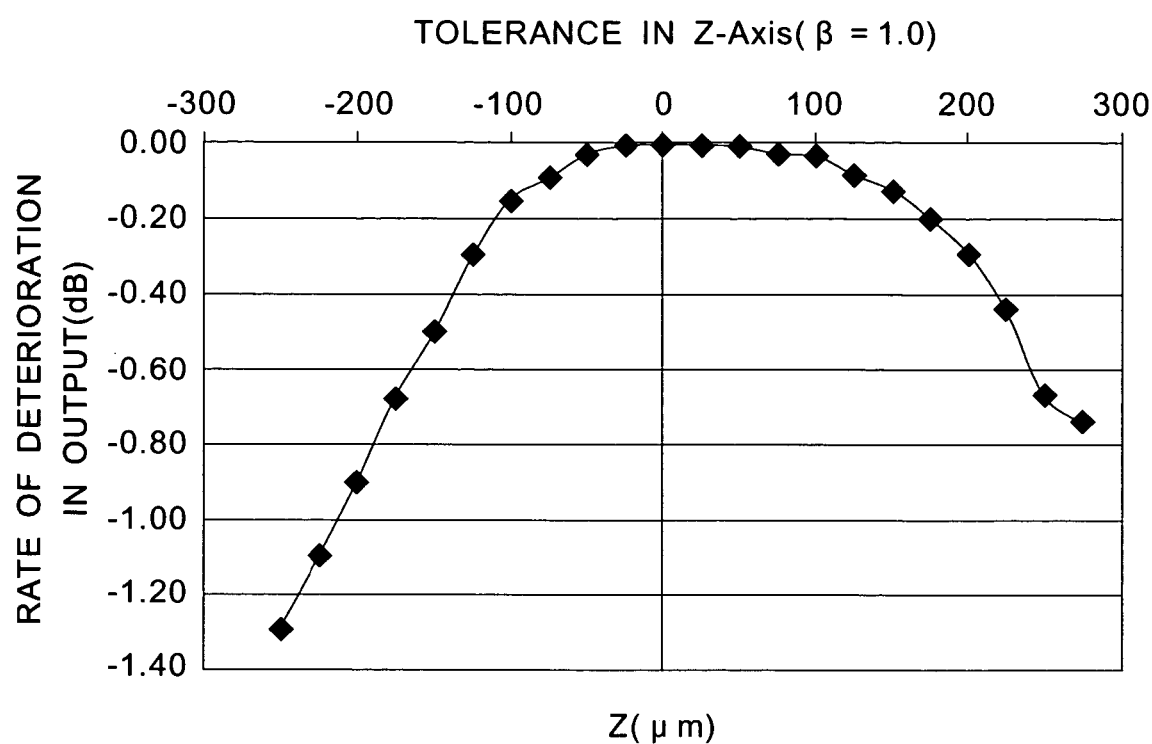
FIG. 4 is a graph showing an example of data referred when a tolerance of width is set, in an example of a method for producing an optical module according to the present invention.

FIG. 4 shows measured data obtained by measuring a variation in conversion efficiency between light signals and electric signals when the power β is 1.0.

In FIG. 4, the axis of abscissas shows a position on Z-axis, and it is assumed that a point at which the conversion efficiency is maximum is point 0, that a direction in which the photoelectric transfer element 8 leaves the lens 2 with respect to the point 0 is positive, and that a direction in which the photoelectric transfer element 8 approaches the lens 2 is negative. Furthermore, the point 0 on the axis of abscissas is the focal point F in FIG. 3.

On the other hand, in FIG. 4, the axis of ordinates shows a deterioration in conversion efficiency with respect to a position on Z-axis, by a rate of deterioration in output (dB). At the point 0 at which the conversion efficiency is maximum, the deterioration in conversion efficiency is 0.00 dB.

Also as can be seen from FIG. 4, the deterioration in conversion efficiency from the maximum efficiency can be regarded as being less than 1.0 dB in a range of ±200 μm (±0.2 mm) from the point 0 in directions of Z-axis.

Therefore, by referring to the measured data of FIG. 4, a range of ±0.6 mm from the focal point F in directions of Z-axis can be univocally determined as a tolerance of width B at a power of 1.0.

After the tolerance of width B is thus set, the lens 2 and the holder 3 are formed so that the dimensional error A of the end face 3a of the holder 3 satisfies expression (1).

Since the dimensional error A can be usually managed within at least ±0.03 mm, the dimensional error A can be smaller than the tolerance of width B (±0.2 mm).

Furthermore, even if errors due to thermal expansion and other errors in design are taken into consideration in addition to the dimensional error, the holder 3 and the lens 2 can be formed so as to sufficiently satisfy expression (1).

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An optical module comprising:
   a holder having an optical fiber mounting hole for mounting therein an optical fiber in one end portion thereof in directions parallel to an optical axis;
   a photoelectric transfer element mounted on a substrate which contacts an end face of the other end portion of said holder to be mounted thereon; and
   a lens, arranged in said holder between the one end portion and the other end portion, for causing said optical fiber to be optically coupled with said photoelectric transfer element, said lens and said holder being integrally formed,
   wherein the sum of an error due to thermal expansion and a dimensional error on the other end portion of said holder in directions parallel to said optical axis is smaller than a preset tolerance of width during the mounting of said photoelectric transfer element on said holder via said substrate.

2. A method for producing an optical module which comprises: a holder having an optical fiber mounting hole for mounting therein an optical fiber in one end portion thereof in directions parallel to an optical axis; a photoelectric transfer element mounted on a substrate which contacts an end face of the other end portion of said holder to be mounted thereon; and a lens, arranged in said holder between the one end portion and the other end portion, for causing said optical fiber to be optically coupled with said photoelectric transfer element, said lens and said holder being integrally formed, said method comprising the steps of:

previously setting a tolerance of width during the mounting of said photoelectric transfer element on the other end portion of said holder;

forming said holder so that the sum of an error due to thermal expansion and a dimensional error on the other end portion of said holder in directions parallel to said optical axis is smaller than said tolerance of width; and causing said substrate, on which said photoelectric transfer element is mounted, to contact an end face of the other end of said holder.

* * * * *